May 7, 1957  E. J. SCHAEFER  2,791,736
OVERLOAD PROTECTOR
Filed Feb. 25, 1954
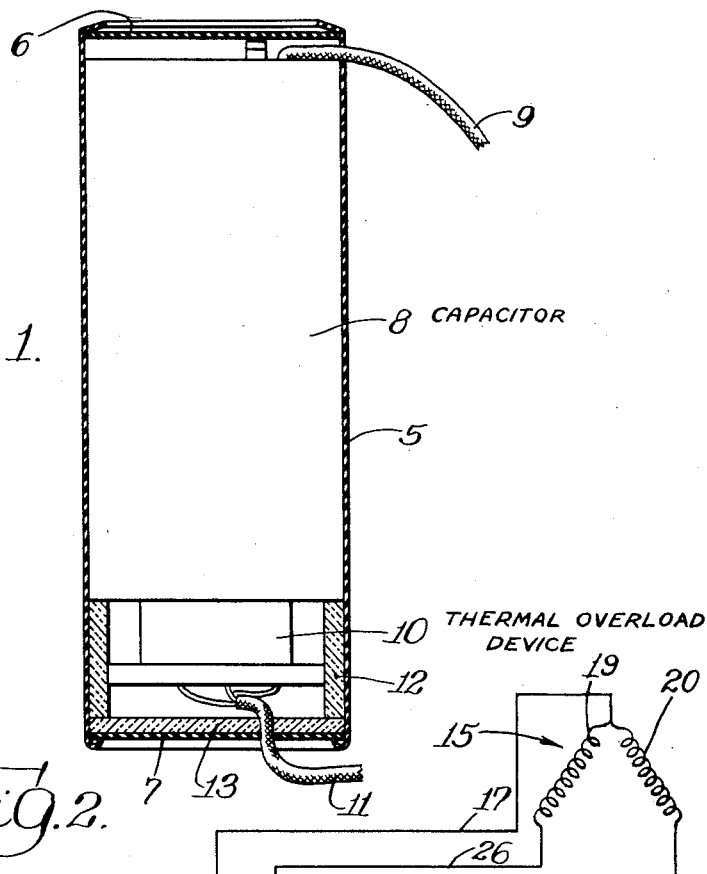
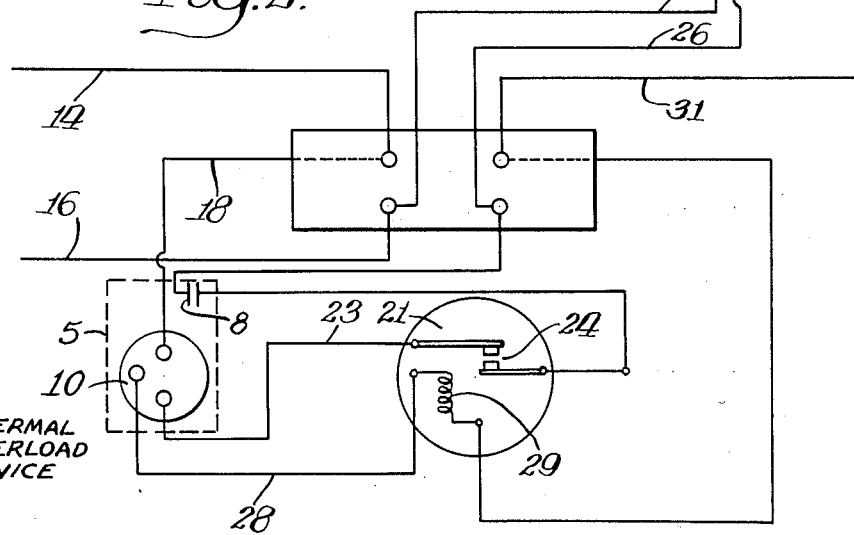
INVENTOR.
Edward J. Schaefer,
BY
Davis, Lindsey, Hibben & Noyes
Attys.

2,791,736

OVERLOAD PROTECTOR

Edward J. Schaefer, Fort Wayne, Ind.

Application February 25, 1954, Serial No. 412,522

5 Claims. (Cl. 318—221)

This invention relates to a novel arrangement of an overload protector in a motor circuit, particularly in connection with a submersible motor.

Generally speaking, an overload protector of the thermo-responsive type for a motor is most frequently mounted inside the motor housing so as to be readily responsive to the heat of the motor. However, for certain applications this is not always feasible. For example, in a submersible motor of the type shown in my U. S. Patent No. 2,654,848, issued October 6, 1953, wherein the stator is elongated and comparatively small in diameter, it is necessary to locate the overload protector externally of the motor because of space restrictions inside the motor and also because the stator interior is filled with a resinous material which would be difficult to exclude from the overload protector housing. Obviously, external location of the overload protector is a disadvantage in that the overload protector is no longer affected by the heat of the motor.

Accordingly, a primary object of my invention is to provide a novel arrangement of an overload protector located externally of the motor which overcomes to a certain extent the aforementioned disadvantage.

A further object of the invention is to provide novel means in an electric motor circuit for improving the sensitivity of an overload protector located externally of the motor housing.

An additional object of the invention is to provide a novel overload protector arrangement for an electric motor which also provides protection for the capacitor means in the motor circuit.

Another object of the invention is to provide novel means in an electric motor circuit for preventing excessive short cycle operation of an overload protector of the automatic recycling type.

Other objects and advantages of the invention will become apparent from the subsequent detailed description taken in conjunction with the accompanying drawing, wherein:

Fig. 1 is a sectional view of a capacitor means embodying the features of the invention; and Fig. 2 is a schematic circuit diagram illustrating the invention.

As mentioned above, the usual overload protector which is provided in a motor circuit operates on a thermo-responsive principle and the device is most often mounted inside the motor housing or casing so as to be directly responsive to the heat of the motor. Under overload conditions, the motor tends to heat up and the thermo-responsive element of the overload protector is thereby actuated for interrupting the motor circuit to stop the operation of the motor. The thermo-responsive means in such an overload protector may comprise a bimetallic element which normally is in closed position to complete a circuit between a pair of electrical contacts. A resistance heating element is included in the circuit and is disposed closely adjacent the bimetallic element so that when an overload condition occurs the heating element tends to heat up. Under the influence of heat from the heating element and also from the motor itself, the bimetallic element flexes and breaks the electrical circuit. With the operation of the motor thus interrupted, both the heating element and the motor cool down and the bimetallic element also cools and ultimately returns to its initial position to reestablish the electrical circuit and thereby restart the motor. If the overload condition no longer exists, the motor will then operate normally. However, if the overload condition still prevails, the circuit will again be broken in the manner just described. This type of overload protector is referred to as the automatic cycling type since successive opening and time delayed closing of the motor circuit will continue until the overload condition is corrected. With an overload protector of the automatic cycling type, a short cycling time is undesirable since it allows the motor to reach an excessive temperature, causes excessive wear of the protector device and the motor parts, and is also harmful to the capacitor means provided in the motor circuit for starting purposes.

As hereinbefore mentioned, there are certain instances wherein an overload protector of the automatic cycling type is used but, for various reasons, cannot be located within the motor housing so as to be directly responsive to the heat of the motor. For example, in a submersible motor of the character hereinbefore referred to, I find it necessary to locate the overload protector in the control box or some other suitable location at the ground level, the motor itself being disposed in a well or the like below the ground level. Consequently, the bimetallic or other thermo-responsive element in the externally located overload protector is responsive only to the current flowing through the heating element circuit and, therefore, tends to be somewhat less sensitive to overload conditions than would be the case when the protector is mounted directly adjacent the motor. In order to overcome this disadvantage to some extent, I mount the overload protector within the housing or insulating cover of the capacitor which is generally provided in the motor circuit for starting purposes. The capacitor is preferably located in the control box at the ground level.

Referring to Fig. 1, the capacitor housing or cover comprises a cylindrical or tubular shell 5 with a top portion 6 and a bottom closure 7, all being made of a suitable electrical insulating material. In this case, the opposite ends of the shell 5 are turned or crimped inwardly to retain the closures 6 and 7 in position. The capacitor means within the housing is shown schematically at 8 with an electrical conductor or cable 9 extending therefrom. Adjacent the bottom of the capacitor means 8, I mount an overload protector 10, preferably in direct heat conductive contact with the capacitor as shown. An electrical conductor 11 extends from the overload protector 10 for connecting the same in circuit. Inasmuch as the overload protector 10 is thereby mounted directly adjacent the capacitor means 8 and within the same casing 5, it will be understood that the overload protector is readily affected by the heat of the capacitor as long as the latter is in the motor circuit which would, of course, be during the starting period. The bottom portion of the capacitor housing or casing is preferably lined with a heat insulation material, such as 12 and 13, surrounding the overload protector 10 in order to prevent too rapid cooling of the thermo-responsive element of the protector.

Fig. 2 is a schematic circuit diagram of the arrangement showing one method of utilizing the overload protector. A line consisting of a pair of leads 14 and 16 is connected to a source of electrical energy. The lead 16 has a permanent connection with a motor lead 17 going directly to the motor windings designated at 19 and 20. The lead 14 connects through a wire 18 with the overload protector 10. A current sensitive relay, indicated generally at 21, and the capacitor 8 are arranged in circuit with the overload protector 10 and the motor indicated generally at 15. The overload protector 10 is connected by a wire 23 through a pair of relay contacts 24 and the capacitor 8 with a motor lead 26 which connects with the starting winding 19 of the motor. The overload protector 10 is also connected by a wire 28 through an energizing coil 29 of the relay with a main motor lead 31 which connects with the running winding 20 of the motor.

Inasmuch as the relay 21 is current sensitive, it will be seen that when the motor is first started, the coil 29 is energized and the relay contacts 24 are thereby closed so that the capacitor 8 is interposed in the starting circuit. However, as the motor comes up to speed, the current to the motor is reduced sufficiently so that the coil 29 allows the relay contacts 24 to open thereby cutting the capacitor 8 out of circuit and permitting the motor to run on the running winding 20 only. It will, of course, be understood that the movable relay contact is biased to open position in the arrangement shown in Fig. 2. Since the overload protector 10 is connected in circuit in both the starting and running conditions of the motor, it will be seen that the motor is protected against overload during both periods. In other words, the circuit breaker action of the overload protector 10 is such that flexure of the bimetallic element thereof in response to overheating breaks both the starting and running circuits of the motor.

Because of the mechanical arrangement shown in Fig. 1 whereby the capacitor 8 and overload protector 10 are enclosed within the same housing or cover 5, the overload protector is responsive not only to the heat developed within the protector during overload operation but is also directly affected by the heat of the capacitor means which, of course heats up during a starting period. Thus, particularly during the starting period, increased protection against overload operation is provided. Also, the positioning of the overload protector immediately adjacent the capacitor provides important additional protection for the capacitor itself because of the aforementioned responsiveness of the overload protector to the heat generated in the capacitor as well as to the heat generated in the protector. As will also be apparent, the arrangement overcomes to a considerable extent the disadvantage encountered by the fact that the overload protector must be located at a remote distance from the motor itself.

A further important advantage of my invention is found in the fact that the arrangement tends to avoid excessively short cycling periods in the overload protector, which is of the automatic recycling type. In the even that a relatively prolonged overload condition is encountered so that the overload protector undergoes intermittent or cyclic operation, it will be seen that the capacitor means 8 will heat up because of the repeated starting operations and the insulation 12—13 around the overload protector 10 will tend to retain both the heat of the capacitor and the heat of the overload protector so that the cycling time becomes increasingly longer. Therefore, the motor windings which are protected from overheating due to their own thermal inertia in the first few cycles will not reach an excessive temperature because, as the heat accumulates in the motor, the cycling time begins to increase. Thus, with a prolonged overload condition, the arrangement prevents too rapid cooling down of the overload protector and thereby avoids the detrimental consequences of short cycle operation for extended periods. In the case of submersible motors or the like, this is frequently of very great importance since there may be cases when no operator or attendant is present at the time an overload condition is encountered and as a result cyclic operation of the overload protector could go on for a matter of days or even longer. Obviously, under these conditions an extended cycling time is very desirable in order to protect the life of the motor and capacitor and also the overload protector itself.

Although the invention has been described in connection with a particular preferred embodiment thereof, it will be understood that various modifications and equivalents may be resorted to without departing from the scope of the invention as defined in the appended claims.

I claim:

1. For use in an electric motor having starting and running windings, a capacitor unit including capacitor means adapted to be connected in circuit with the starting winding and an enclosing cover for said means, and an overload protector of the thermo-responsive type having means adapted to be connected in circuit with both windings for interrupting the current flow thereto in response to heat generated as a consequence of overload current flow to the motor, said protector being contained within said cover in close proximity to said capacitor means whereby said overload protector is also responsive to heat generated by said capacitor means.

2. For use with an electric motor having starting and running windings and cut-out means for disconnecting the starting winding when the motor comes up to speed, a capacitor unit comprising capacitor means adapted to be connected in circuit with the starting winding and the cut-out means and a thermal insulated enclosure containing said capacitor means, and an overload protector of the automatic cycling thermo-responsive type adapted to be connected in circuit with both windings to control the current flow thereto in response to heat generated as a consequence of overload current flow to the motor, said protector being contained within said enclosure in close proximity to said capacitor means whereby the overload protector is also responsive to heat generated by said capacitor means so that upon repeated cyclic operation of the overload protector under prolonged overload conditions the cycle time is substantially increased by the heat effect of the capacitor means which heats up during repeated starts of the motor.

3. For use with an electric motor having starting and running windings, a capacitor unit having an external casing and capacitor means contained within said casing and adapted to be connected in circuit with the starting winding, an overload protector of the thermo-responsive type adapted to be connected in circuit with both windings to control current flow thereto in response to heat generated as a consequence of overload current flow to the motor, said protector being mounted within said casing in direct heat conductive contact with said capacitor means so as to be responsive also to heat generated by said capacitor means, and heat insulating means within said casing and surrounding said protector for preventing too rapid cooling thereof.

4. The device of claim 1 further characterized in that said overload protector is mounted in direct heat conductive contact with said capacitor means within said cover.

5. For use with an electric motor having starting and running windings, a combined capacitor and overload protector unit adapted to be located remotely from the motor, said unit comprising a capacitor housing having capacitor means contained therein and adapted to be connected in circuit with the starting winding, an overload protector of the thermo-responsive automatic cycling type mounted within said housing in heat conductive contact with said capacitor means and adapted to be connected in circuit with both windings to control current flow thereto in response to heat generated as a consequence of overload current flow to the motor, said overload protector thereby being responsive to heat generated by said capacitor means as well as that generated in consequence of overload current flow to the motor, and a heat insulating liner within said housing surrounding said overload protector to reduce heat loss therefrom whereby to avoid excessive short cycle operation of the overload protector.

References Cited in the file of this patent

UNITED STATES PATENTS 2,495,189     Stein et al.             Jan. 17, 1950